(12) United States Patent
Agarwal et al.

(10) Patent No.: US 10,728,087 B2
(45) Date of Patent: Jul. 28, 2020

(54) SYSTEM AND METHODS TO SIGNAL AUTO FACILITY BYPASS TUNNEL GENERATION INDICATION AND BACKUP RESELECTION REQUEST FOR FAST REROUTE CAPABLE DOWNSTREAM ROUTERS IN MPLS

(71) Applicant: Ciena Corporation, Hanover, MD (US)

(72) Inventors: Gaurav Agarwal, New Delhi (IN); Jayant Kumar Bhardwaj, New Delhi (IN); Manoj Rautela, Pithoragarh (IN); Vinay Prakash, Patna (IN)

(73) Assignee: Ciena Corporation, Hanover, MD (US)

( * ) Notice: Subject to any disclaimer, the term of this patent is extended or adjusted under 35 U.S.C. 154(b) by 154 days.

(21) Appl. No.: 16/106,392

(22) Filed: Aug. 21, 2018

(65) Prior Publication Data

US 2020/0014585 A1  Jan. 9, 2020

(30) Foreign Application Priority Data

Jul. 3, 2018 (IN) .............................. 201811024823

(51) Int. Cl.
| | |
|---|---|
| *H04L 12/24* | (2006.01) |
| *H04L 12/947* | (2013.01) |
| *H04L 12/723* | (2013.01) |
| *H04L 12/46* | (2006.01) |

(52) U.S. Cl.
CPC ...... *H04L 41/0668* (2013.01); *H04L 12/4633* (2013.01); *H04L 41/08* (2013.01); *H04L 45/50* (2013.01); *H04L 49/25* (2013.01)

(58) Field of Classification Search
CPC combination set(s) only.
See application file for complete search history.

(56) References Cited

U.S. PATENT DOCUMENTS

| | | | | |
|---|---|---|---|---|
| 2008/0170493 | A1* | 7/2008 | Vasseur | H04L 45/00 370/217 |
| 2009/0292942 | A1* | 11/2009 | Bhat | H04L 41/0668 714/4.1 |
| 2009/0292943 | A1* | 11/2009 | Hanif | H04L 45/00 714/4.1 |

\* cited by examiner

*Primary Examiner* — Lakeram Jangbahadur
(74) *Attorney, Agent, or Firm* — Clements Bernard Walker; Christopher L. Bernard; Lawrence A. Baratta, Jr.

(57) ABSTRACT

Systems and methods for auto creation of bypass tunnels in Fast Reroute (FRR) downstream routers include configuring one or more Label Switched Path (LSP) tunnels between an ingress Label Edge Router (LER) and an egress LER via one or more Label Switch Routers (LSRs); signaling at least one LSP tunnel of the one or more LSP tunnels with a Resource Reservation Protocol (RSVP) PATH message containing a FAST_REROUTE object with a first flag indicating Facility Backup protection is desired and a second flag indicating auto generation of an associated FB bypass tunnel; and configuring the associated FB bypass tunnel between a Point of Local Repair (PLR) and a Merge Point (MP) based on the first flag and the second flag. The systems and methods can further include bypass tunnel reselection requests to a bypass tunnel with better protection.

14 Claims, 8 Drawing Sheets

```
CLASS-NUM = 205
    C-TYPE = 1
```

| 1 | 2 | 3 | 4 |
|---|---|---|---|
| \multicolumn{2}{LENGTH (BYTES)} | CLASS-NUM | C-TYPE |
| SETUP PRIOR | HOLD PRIOR | HOP LIMIT | FLAGS |
| BANDWIDTH ||||
| INCLUDE-ANY ||||
| EXCLUDE-ANY ||||
| INCLUDE ALL ||||

Flags

0x01  One-to-One Backup Desired
      Requests protection via the one-to-one backup method.

0x02  Facility Backup Desired
      Requests protection via the facility backup method.

0x04 Auto Generation Desired      -- NEW
    *Requests protection with "desire" to Auto-Generate the Facility Bypass Tunnel, if required.*

SESSION_ATTRIBUTE class = 207, LSP_TUNNEL C-Type = 7

```
0            1            2            3
┌────────────┬────────────┬────────────┬────────────┐
│SETUP PRIOR │ HOLD PRIOR │   FLAGS    │NAME LENGTH │
├────────────┴────────────┴────────────┴────────────┤
│                                                   │
│     SESSION NAME    (NULL PADDED DISPLAY STRING)  │
│                                                   │
└───────────────────────────────────────────────────┘
```

Flag   Name
0x01   Local protection desired
0x02   Local recording desired
0x04   SE Style desired
0x08   Bandwidth protection desired
0x10   Node protection desired
0x20   Path re-evaluation request
0x40   Soft Preemption Desired

*0x80   FRR Backup Reselection Request*

SYSTEM AND METHODS TO SIGNAL AUTO FACILITY BYPASS TUNNEL GENERATION INDICATION AND BACKUP RESELECTION REQUEST FOR FAST REROUTE CAPABLE DOWNSTREAM ROUTERS IN MPLS

FIELD OF THE DISCLOSURE

The present disclosure generally relates to networking, namely Multiprotocol Label Switching (MPLS). More particularly, the present disclosure relates to systems and methods for signaling Auto Facility Bypass Tunnel Generation Indication and Backup Reselection Request for Fast Reroute (FRR) capable downstream routers in MPLS.

BACKGROUND OF THE DISCLOSURE

Multiprotocol Label Switching (MPLS) is a mechanism applied in networks that directs data from one network node or network element to the next based on locally significant short path labels rather than long, globally significant, network addresses, thereby avoiding complex lookups in a routing table. For example, MPLS is described, in part, in Request for Comments (RFC) 3032 "MPLS Label Stack Encoding," January 2001, the contents of which are incorporated by reference herein. Fast Reroute (FRR) is an MPLS resiliency technique providing fast traffic recovery upon link or router failures for critical services. Upon any single link or node failures, the technique would be able to recover impacted traffic flows at the level of 50 ms. FRR is described in RFC 4090 "Fast Reroute Extensions to RSVP-TE for LSP Tunnels," May 2005, the contents of which are incorporated by reference herein. Resource Reservation Protocol-Traffic Engineering (RSVP-TE) extensions are defined in RFC 3209 "Extensions to RSVP for LSP Tunnels," December 2001, the contents of which are incorporated by reference herein.

RFC 3209 describes the use of RSVP, including all the necessary extensions, to establish Label Switched Path (LSP) in MPLS. Since the flow along an LSP is completely identified by the label applied at the ingress node of the path, these paths may be treated as tunnels. An application of LSP tunnels is traffic engineering with MPLS as specified in RFC 2702, "Requirements for Traffic Engineering Over MPLS," September 1999, the contents of which are incorporated by reference herein.

RFC 4090 defines RSVP-TE extensions to establish backup LSP tunnels for local repair of LSP tunnels. These mechanisms enable the re-direction of traffic onto backup LSP tunnels in 10 s of milliseconds, in the event of a failure. Two approaches are defined, a one-to-one backup approach creates detour LSPs for each protected LSP at each potential point of local repair and a Facility Backup (FB) approach creates a bypass tunnel to protect a potential failure point. By taking advantage of MPLS label stacking, the bypass tunnel approach can protect a set of LSPs that have similar backup constraints. Both approaches can be used to protect links and nodes during a network failure. The described behavior and extensions to RSVP allow nodes to implement either approach or both and to interoperate in a mixed network.

In the FB approach, local protection is provided on a Point of Local Repair (PLR) by creating a backup path over another tunnel which originates on the PLR and terminates on a Merge Point (MP), bypassing the protected router. The FB approach requires an existing Facility Backup tunnel. Alternatively, such a Facility Backup tunnel can also be auto-created, in the absence of an "existing" Facility Backup Tunnel. Currently, there is no such mechanism to control the auto-generation on a per protected tunnel basis; it is something which must be configured on the PLR.

BRIEF SUMMARY OF THE DISCLOSURE

Also, in the current FB approach, a backup path provides bandwidth protection as well as node protection. However, in case the bandwidth protection is not available, RFC 4090 suggests to fallback to a backup path which does not provide bandwidth protection. Similarly, if node protection is desired, and it is not possible for the PLR to provide node protection, fallback to link protection is suggested. Flags in a SESSION_ATTRIBUTE object of an RSVP PATH message are used to request bandwidth and node protection explicitly. Flags in a Record Route Object (RRO) IPv4 sub-object (in an RSVP RESV message) report back to an ingress Label Edge Router (LER), whether bandwidth and/or node protection are provided as requested. It is possible that since the selection of the backup path, another path has become available, which can now offer the desired protection. However, currently there is no mechanism which can trigger a reselection.

In an embodiment, a method for auto-creation of bypass tunnels in Fast Reroute (FRR) downstream routers includes configuring one or more Label Switched Path (LSP) tunnels between an ingress Label Edge Router (LER) and an egress LER via one or more intermediate Label Switch Routers (LSRs); signaling at least one LSP tunnel of the one or more LSP tunnels with a Resource Reservation Protocol (RSVP) PATH message containing a FAST_REROUTE object with a first flag indicating Facility Backup protection is desired and a second flag indicating auto-generation of a bypass tunnel; and configuring the bypass tunnel between a Point of Local Repair (PLR) and a Merge Point (MP) based on the first flag and the second flag, wherein the PLR is one of the intermediate LSRs and the MP is one of the intermediate LSRs or the egress LER. The method can further include, responsive to a fault between the PLR and the MP, switching the one or more LSP tunnels to the bypass tunnel.

The one or more LSP tunnels can include N tunnels, $N>1$, and wherein the bypass tunnels can include M tunnels, $M \geq 1$, such that the M bypass tunnels provide M:N protection between the PLR and the MP. The bypass tunnel can be created based on a type of the protection desired, wherein the type can include one or more of node protection and bandwidth protection. The bypass tunnel's protection can have a characteristic providing less than the protection desired. The method can further include creating a new bypass tunnel which has better protection with respect to the protection desired than the bypass tunnel; and signaling the at least one LSP tunnel with a Resource Reservation Protocol (RSVP) PATH message containing a SESSION_ATTRIBUTE object with a third flag requesting backup reselection leading to the at least one LSP tunnel to dissociate with the bypass tunnel and associate with the new bypass tunnel. The characteristic can be a bandwidth amount.

In another embodiment, a Multiprotocol Label Switching (MPLS) network includes an ingress Label Edge Router (LER); an egress LER; and one or more Label Switch Routers (LSRs) between the ingress LER and the egress LER, wherein one or more Label Switched Path (LSP) tunnels are configured between the ingress LER and the egress LER via the one or more LSRs, wherein at least one LSP tunnel of the one or more LSP tunnels is signaled with a Resource Reservation Protocol (RSVP) PATH message containing a FAST_REROUTE object with a first flag indicating Facility Backup protection is desired and a second flag indicating auto-generation of a bypass tunnel, and wherein the bypass tunnel is configured between a Point of Local Repair (PLR) and a Merge Point (MP) based on the first flag and the second flag, wherein the PLR is one of the intermediate LSRs and the MP is one of the intermediate LSRs or the egress LER. Responsive to a fault between the PLR and the MP, the one or more LSP tunnels can be switched to the bypass tunnel.

The one or more LSP tunnels can include N tunnels, N>1, and wherein the bypass tunnels can include M tunnels, M≥1, such that the M bypass tunnels provide M:N protection between the PLR and the MP. The bypass tunnel can be created based on a type of the protection desired, wherein the type can include one or more of node protection and bandwidth protection. The bypass tunnel's protection can have a characteristic providing less than the protection desired. The ingress LER can cause signaling of the at least one LSP tunnel with a Resource Reservation Protocol (RSVP) PATH message containing a SESSION_ATTRIBUTE object with a third flag requesting backup reselection, and a new bypass tunnel can be manually or auto created with better protection with respect to the protection desired than the bypass tunnel leading to the at least one LSP tunnel to dissociate with the bypass tunnel and associate with the new bypass tunnel. The characteristic can be a bandwidth amount.

In another embodiment, a network element which is a Point of Local Repair (PLR) in a Multiprotocol Label Switching (MPLS) network includes a plurality of ports; forwarding circuitry configured to switch packets between the plurality of ports; and control circuitry communicatively coupled to the plurality of ports and the forwarding circuitry, wherein one or more Label Switched Path (LSP) tunnels are configured between an ingress Label Edge Router (LER) and an egress LER via the plurality of ports and one or more intermediate Label Switch Routers (LSRs), wherein at least one LSP tunnel of the one or more LSP tunnels is signaled with a Resource Reservation Protocol (RSVP) PATH message containing a FAST_REROUTE object with a first flag indicating Facility Backup protection is desired and a second flag indicating auto-generation of a bypass tunnel, and wherein the control circuitry configures the bypass tunnel between a port of the plurality of ports and a Merge Point (MP) based on the first flag and the second flag, wherein the PLR is one of the intermediate LSRs and the MP is one of the intermediate LSRs or the egress LER. Responsive to a fault between the PLR and the MP, the one or more LSP tunnels can be switched to the bypass tunnel.

The one or more LSP tunnels can include N tunnels, N>1, and wherein the bypass tunnels can include M tunnels, M≥1, such that the M bypass tunnels provide M:N protection between the PLR and the MP. The bypass tunnel can be created based on a type of the protection desired, wherein the type can include one or more of node protection and bandwidth protection. The bypass tunnel's protection can have a characteristic providing less than the protection desired. The control circuitry can cause signaling of the at least one LSP tunnel with a Resource Reservation Protocol (RSVP) PATH message containing a SESSION_ATTRIBUTE object with a third flag requesting backup reselection, and a bypass tunnel can be manually or auto created with better protection with respect to the protection desired than the bypass tunnel leading to the at least one LSP tunnel to dissociate with the bypass tunnel and associate with the new bypass tunnel.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various embodiments, the present disclosure relates to systems and methods for signaling Fast Reroute capable downstream routers in MPLS, related to auto-generation of FB tunnels and/or reselection of a better backup path. In an embodiment, the systems and methods provide control on the ingress LER to signal if "auto-generation" of a bypass tunnel is desired or not. This will not only provide better control to the operator, but it will also help save the resources in the network for the FRR tunnels, which do not need a bypass tunnel to be pre-generated. The systems and methods use the existing FAST_REROUTE object allowing this approach to be smoothly adopted by existing FRR supported devices. The existing bit-field in the "Flag" is not modified, however extended by another "bit," edits in the FAST_REROUTE Object can simply be ignored (without any code change) on devices not supporting the systems and methods. The systems and methods save network resources, ensuring that there are no unnecessary auto-generated tunnels in the network, especially in large networks it is desired to have such mechanism to control auto-generation.

In another embodiment, the systems and methods provide a signaling mechanism, which can request a PLR to reconsider a backup selection for movement to a better bypass path, which complies to initially desired protection (or a better path than the current path with respect to the initially desired protection). The signaling mechanism can be signaled by the ingress Label Edge Router (LER), either i) periodically, ii) based on some network event, and/or iii) a user/manual trigger. The existing SESSION_ATTRIBUTE object is updated with a new flag value to indicate such "reselection request." Again, the systems and methods use existing standard RSVP-TE objects, enabling compatibility with any device which does not support this flag. The systems and methods provide a mechanism to break-out of a compromise (to a path which did not meet all protection requirements) and thus provide the initially desired protection level.

MPLS Network

Figure 1:
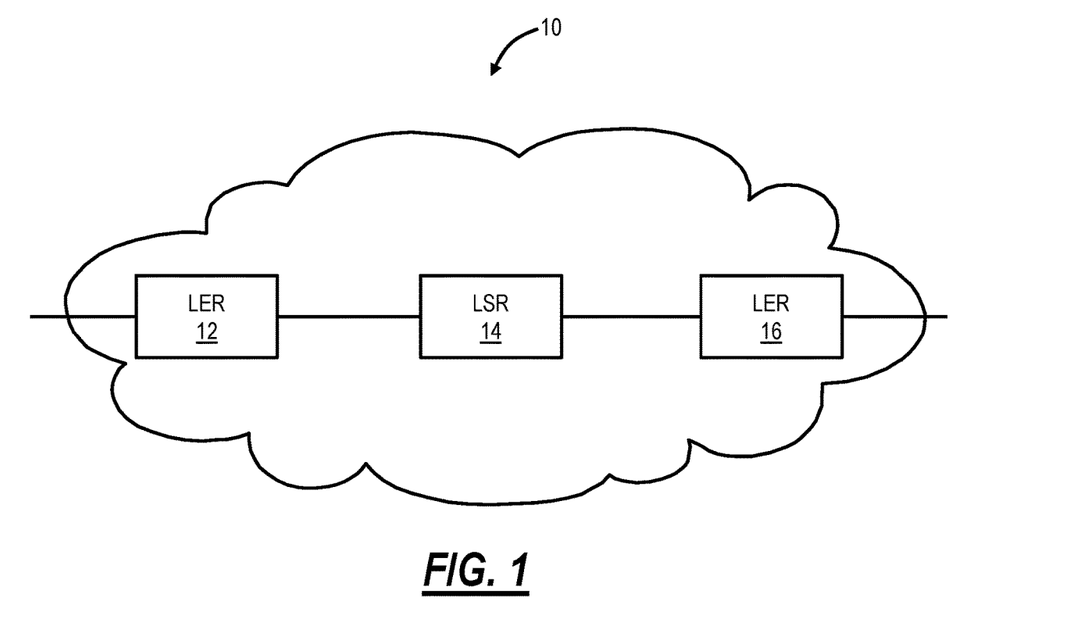
FIG. 1 is a network diagram of an example MPLS network with three network elements contained therein.

FIG. 1 is a network diagram of an example MPLS network 10 with three network elements 12, 14, 16 contained therein. The network elements 12, 16 are Label Edge Routers (LER) and the network element 14 is a Label Switch Router (LSR). The MPLS network 10 is presented herein for illustration purposes and those of ordinary skill in the art will recognize other deployments can include additional network elements. Within the MPLS network 10, the LSR 14 is configured to forward traffic along Label Switched Paths (LSPs) between the LERs 12, 16. MPLS is used in the MPLS network 10 to reduce the number of lookups performed at the various network elements 12, 14, 16. For example, a packet can be received by the LER 12 which conventionally performs a lookup to determine which label should be pushed onto the packet to switch the packet onto an LSP to the next hop through the MPLS network 10 to reach its destination. When the packet arrives at the LSR 14, the LSR 14 reads the MPLS label and replace the MPLS label with a new MPLS label. MPLS thus allows a single route lookup to be performed at the edge of the MPLS network 10, and allows label switching to be used instead of lookups to forward the packet across the MPLS network 10. Forwarding in an MPLS network 10 is performed by swapping a label after stripping the Media Access Control (MAC) header at each hop.

Example Network Element

Figure 2:
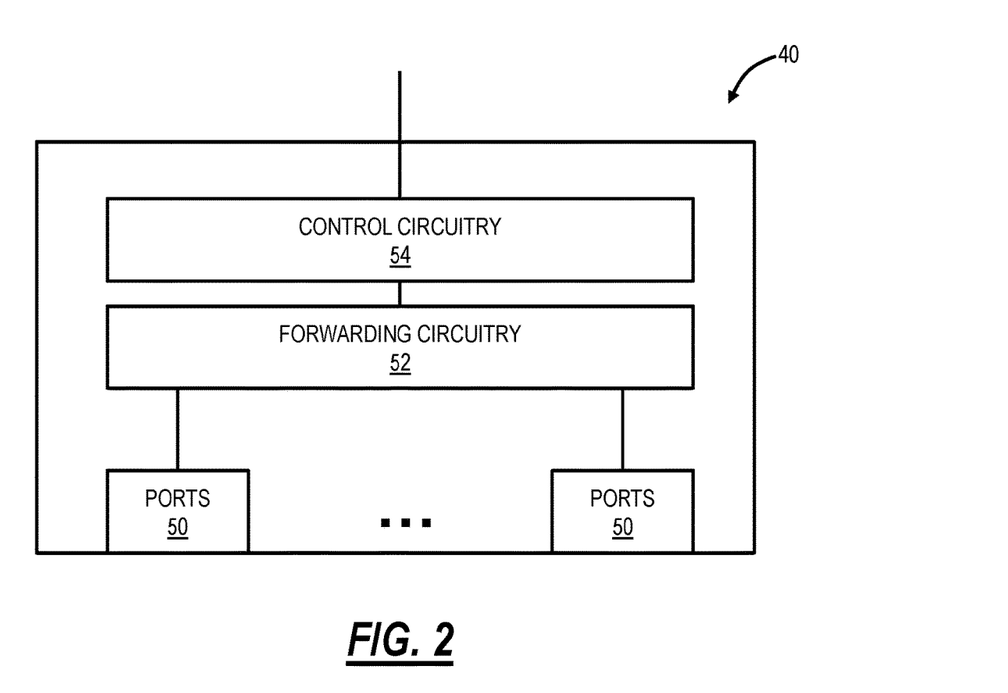
FIG. 2 is a block diagram of an example network element which may be used with the systems and methods.

FIG. 2 is a block diagram of an example network element 40 which may be used with the systems and methods. In this example, the network element 40 is a switch for illustration purposes, but those of ordinary skill in the art will recognize the systems and methods described herein contemplate other types of network elements and other implementations. In this embodiment, the network element 40 includes a plurality of ports 50, forwarding circuitry 52, and control circuitry 54. The network element 40 can be an LER, LSR, etc. The ports 50 provide physical connectivity of the network element 40 to other network elements, switches, routers, etc. The ports 50 are configured to provide ingress and egress of packets such as packets utilizing MPLS. The forwarding circuitry 52 is configured to forward a received packet with one a label associated with another network element. The control circuitry 54 is configured to provide exchange and/or flooding according to various protocols. For example, the control circuitry 54 can perform the Intermediate System to Intermediate System (IS-IS) protocol, Label Distribution Protocol (LDP), etc.

Auto-Generation of Bypass Tunnels

Figure 3:
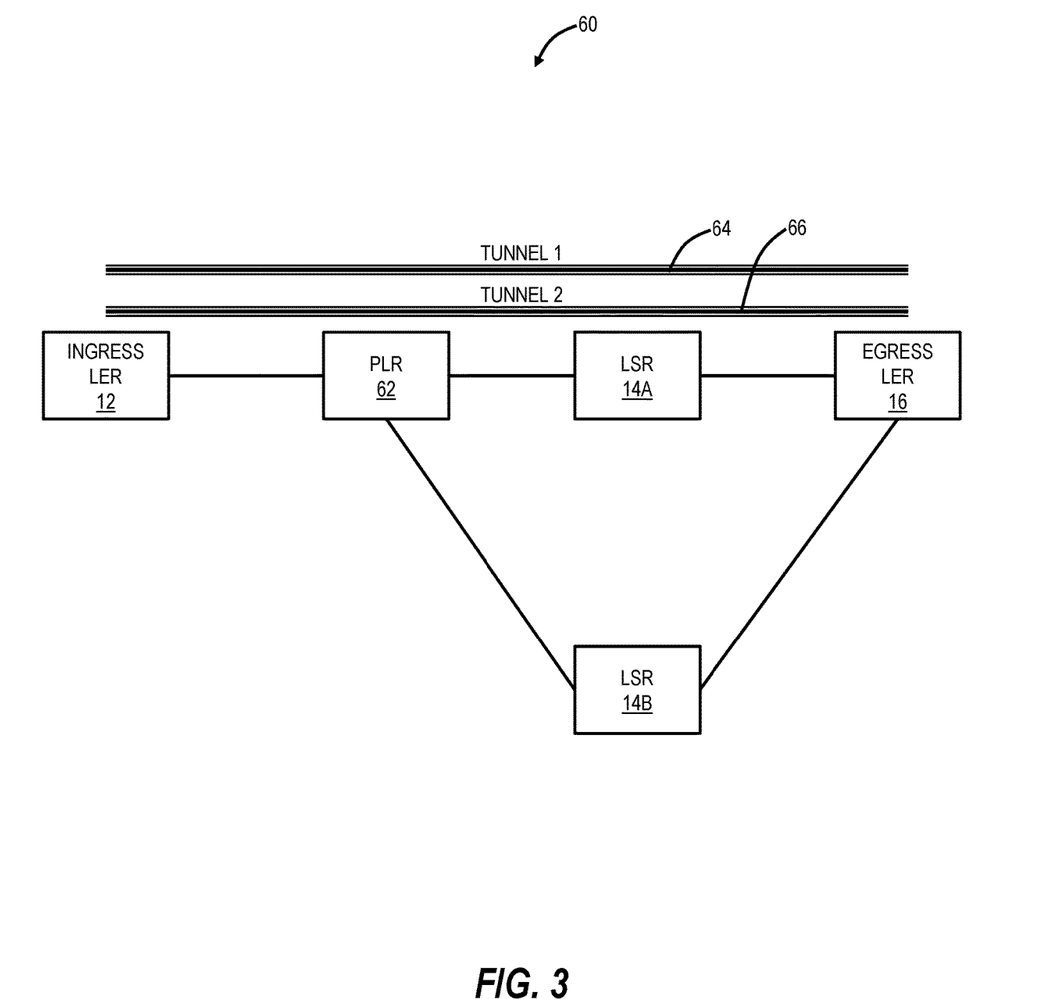
FIG. 3 is a network diagram of an MPLS network which includes two ingress Label Edge Routers (LERs), two Label Switch Routers (LSRs), and a Point of Local Repair (PLR)
Figure 4:
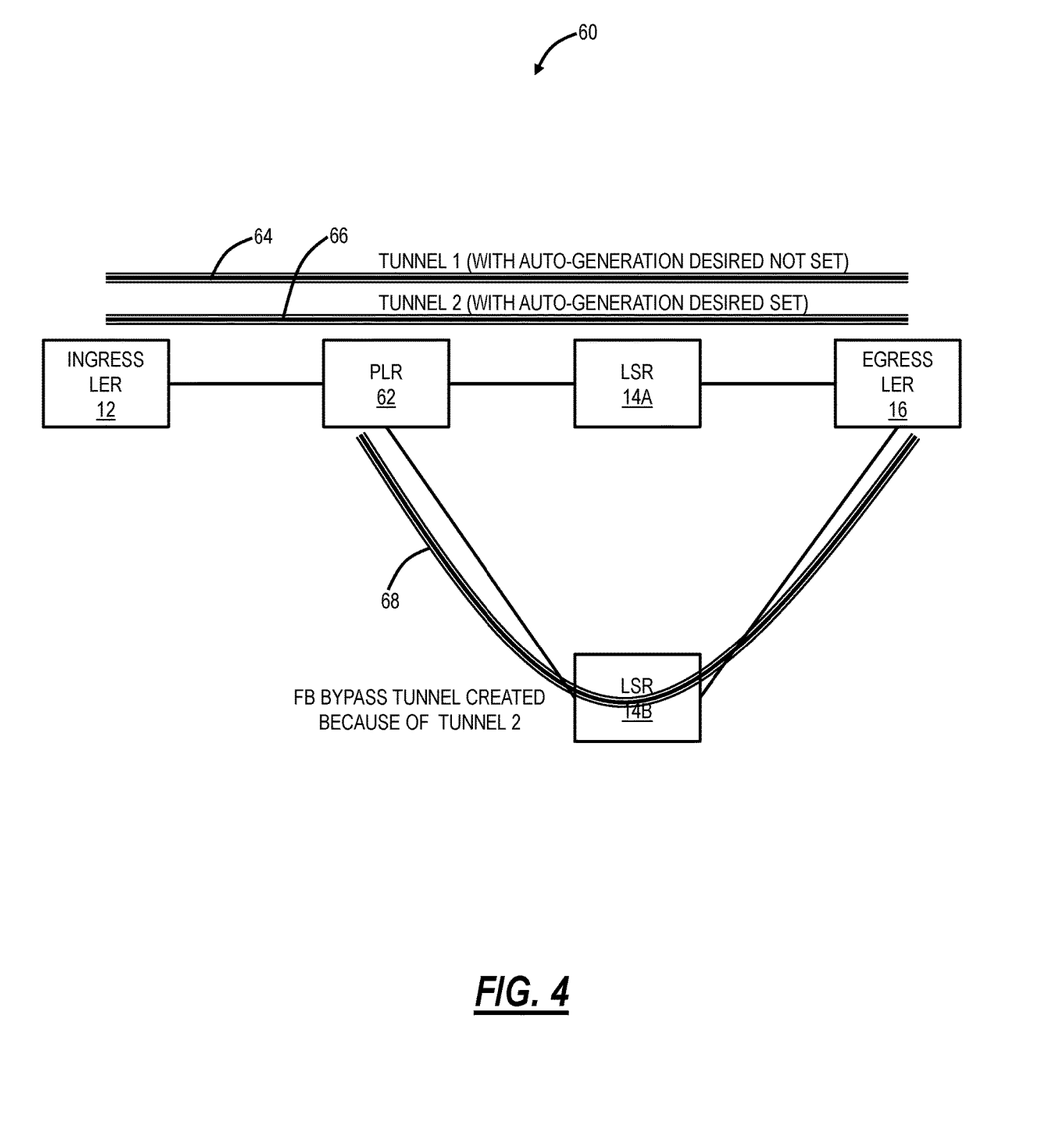
FIG. 4 is a network diagram of the MPLS network of FIG. 3 with a Facility Backup bypass tunnel auto-created for the tunnel.

FIG. 3 is a network diagram of an MPLS network 60 which includes two LERs 12, 16, two LSRs 14A, 14B, and a PLR 62. FIG. 4 is a network diagram of the MPLS network 60 with a bypass tunnel 68 auto-created for the tunnel 66. The MPLS network 60 is presented for illustration purposes to describe the deficiencies in the current RFC 4090 implementation for FRR as well as the systems and methods. Those of ordinary skill in the art will recognize other network configurations are also contemplated. In FIG. 3, there are two tunnels 64, 66 configured between the ingress LER 12 and the egress LER 16, via the PLR 62 and the LSR 14A. The PLR 62 can be an LSR or the like and the PLR 62 is connected to both the LSRs 14A, 14B which both then connect to the egress LER 16. The tunnels 64, 66 support the Facility Backup approach in RFC 4090.

The auto-generation of a bypass tunnel is triggered for an FRR protected tunnel 64, 66 based on the FAST_REROUTE object. The generation of a new auto-generated FB tunnel might not always be desired, such as in the case some tunnels use existing FB tunnels (or no FB at all). Also, for tunnels which do not "strictly" require the protection on "each" node/link on the tunnel path, may choose to opt-out of auto-generation, e.g., an operator can selectively create bypass tunnels on the nodes/links to provide protection, where it is desired.

There is no conventional mechanism to control the auto-generation of the bypass tunnel on a per protected "client" FRR tunnel basis. Since the path of the FRR tunnel is not always fixed (the tunnel could be completely dynamic routed), it is useful to signal the "control of auto-generation of bypass tunnel" for each FRR tunnel. The conventional approach requires configuration of each potential PLR 62 to enable/disable the auto-generation of a bypass tunnel. Of course, this is cumbersome especially in large networks and/or where the tunnel path is dynamic and hence unpredictable.

In FIG. 3, for RSVP-TE FRR, in order to provide local protection, a "Facility Backup Tunnel" is required at the downstream PLR 62. In the absence of such tunnel, a bypass tunnel can be auto-created if the PLR 62 supports the auto-generation, however there is no mechanism to control this auto-generation on a per-tunnel basis. In case there are two LSPs passing through the PLR 62, for the tunnel 64, protection can be required based on best effort, hence it should not trigger any bypass tunnel. However, for the tunnel 66, protection should be provided as soon as possible, hence it should trigger a bypass tunnel on the PLR 62.

Flag for Auto-Generation of Bypass Tunnels

Figure 5:
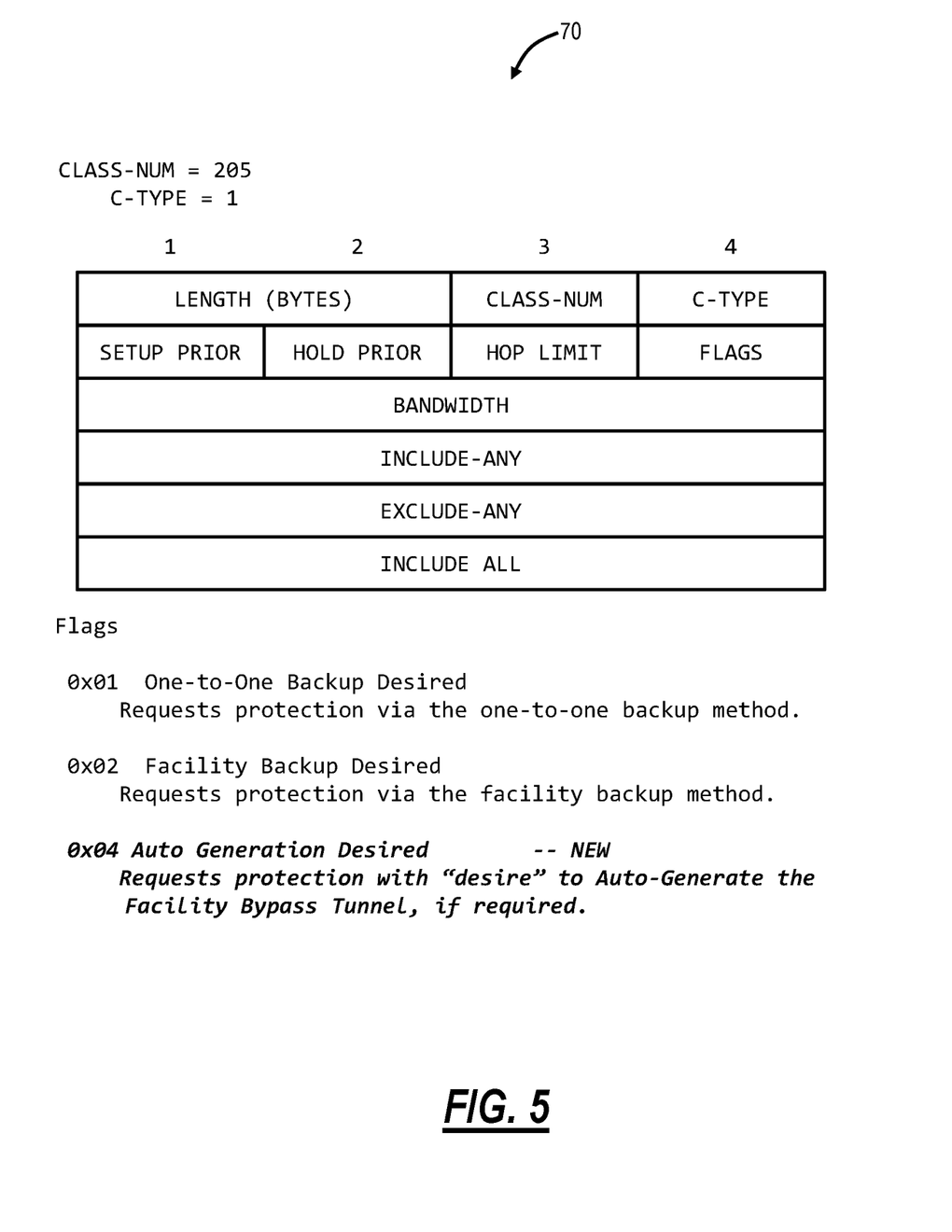
FIG. 5 is a diagram of a FAST_REROUTE object which is defined in Sec. 4.1 of RFC 4090.

FIG. 5 is a diagram of a proposed FAST_REROUTE object 70 based on the definition in Sec. 4.1 of RFC 4090. The FAST_REROUTE object 70 is used to control the backup used for the protected LSP and specifies the setup and hold priorities, session attribute filters, and bandwidth to be used for protection. It also allows a specific local protection method to be requested. This object is inserted into the PATH message by the head-end LER and must not be changed by downstream LSRs. The FAST_REROUTE object 70 has the format in FIG. 5. The FAST_REROUTE object 70 extends RSVP-TE for FRR signaling and is backward compatible with LSRs that do not recognize the extensions to the FAST_REROUTE object 70. The FAST_REROUTE object 70 is carried in an RSVP PATH message.

The setup priority is the priority of the backup path with respect to reserving resources, in the range 0 to 7. The value 0 is the highest priority. Setup Priority is used in deciding whether this session can preempt another session. The holding priority is the priority of the backup path with respect to holding resources, in the range 0 to 7. The value 0 is the highest priority. Holding Priority is used in deciding whether this session can be preempted by another session. The Hop-limit is the maximum number of extra hops the backup path is allowed to take, from current node (a PLR) to an MP, with PLR and MP excluded from the count. For example, hop-limit of 0 means that only direct links between PLR and MP can be considered. In these FIGS., the LER 16 is the MP.

The bandwidth field is a bandwidth estimate, a 32-bit IEEE floating point integer, in bytes per second. The Exclude-any field is a 32-bit vector representing a set of attribute filters associated with a backup path, any of which renders a link unacceptable. The Include-any field is a 32-bit vector representing a set of attribute filters associated with a backup path, any of which renders a link acceptable (with respect to this test). The Include-all field is a 32-bit vector representing a set of attribute filters associated with a backup path, all of which must be present for a link to be acceptable (with respect to this test).

The flags in RFC 4090 include 0x01 indicating One-to-One Backup Desired which requests protection via the one-to-one backup method or 0x02 indicating Facility Backup Desired which requests protection via the facility backup method. In an embodiment, the systems and methods extend the flags field in the FAST_REROUTE object 70 for auto-generation of the bypass tunnel. For example, a new flag 0x04 Auto Generation Desired can be employed which requests protection with a "desire" to auto-generate the bypass tunnel, if required.

The FRR Flag in the FAST_REROUTE object 70 contained in an RSVP PATH message is modified by adding one more value for the flag to indicate if Auto Generation of the bypass tunnel is desired. Based on this setting, the PLR 62 can auto-generate the bypass tunnel, only if an FRR tunnel requests it.

In FIG. 4, the tunnel 64 has its associated FAST_REROUTE object 70 with the FRR flag for auto-generation not set. The tunnel 66 has its associated FAST_REROUTE object 70 with the flag for the auto-generation set. Unless the tunnel 66 is signaled, there is no trigger to create the bypass tunnels between the PLR 62, the LSR 14B, and the LER 16. Assuming the tunnel 66 is signaled, the tunnel 64 is still eligible to use the bypass tunnel 68, as and when it is created, either manually or triggered by the FFR flags in the FAST_REROUTE object 70 for the tunnel 66.

Process for Auto-Generation of Bypass Tunnels

Figure 6:
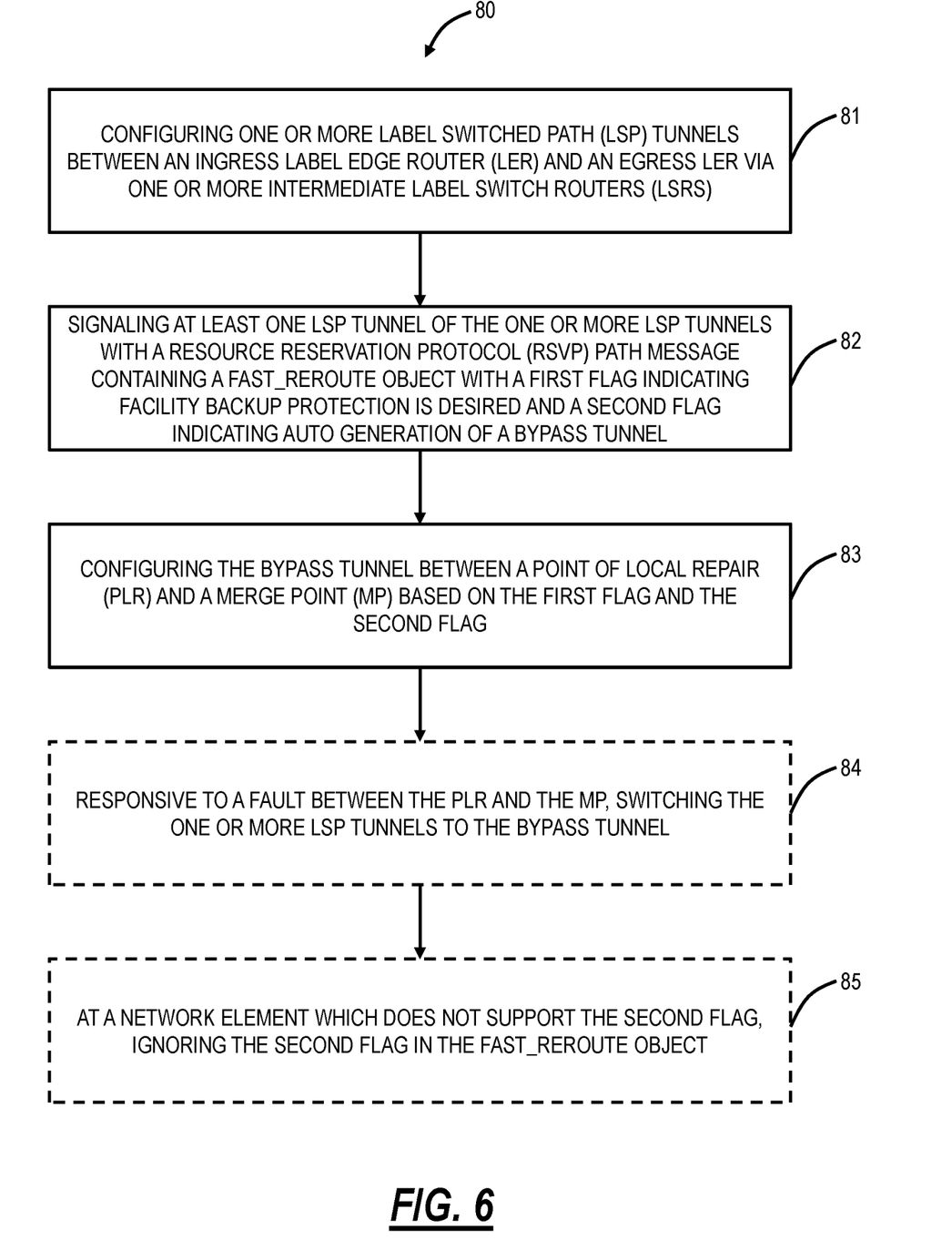
FIG. 6 is a flowchart of a process for auto-creation of Facility Backup (FB) bypass tunnels in Fast Reroute (FRR) downstream routers.

FIG. 6 is a flowchart of a process 80 for auto-creation of bypass tunnels in Fast Reroute (FRR) downstream routers. The process 80 includes configuring one or more Label Switched Path (LSP) tunnels between an ingress Label Edge Router (LER) and an egress LER via one or more Label Switch Routers (LSRs) (step 81); signaling at least one LSP tunnel of the one or more LSP tunnels with a Resource Reservation Protocol (RSVP) PATH message containing a FAST_REROUTE object with a first flag indicating Facility Backup protection is desired and a second flag indicating auto generation of a bypass tunnel (step 82); and configuring the bypass tunnel between a Point of Local Repair (PLR) and a Merge Point (MP) based on the first flag and the second flag (step 83).

The process 80 can further include, responsive to a fault between the PLR and the MP, switching the one or more LSP tunnels to the bypass tunnel (step 84). The process 80 can further include, at a network element which does not support the second flag, ignoring the second flag in the FAST_REROUTE object (step 85). The one or more LSP tunnels can include N tunnels, N>1, and the bypass tunnels can include M tunnels, M≥1, such that the M bypass tunnels provide M:N protection between the PLR and the MP.

Reselection of Backup Tunnels

Figure 7:
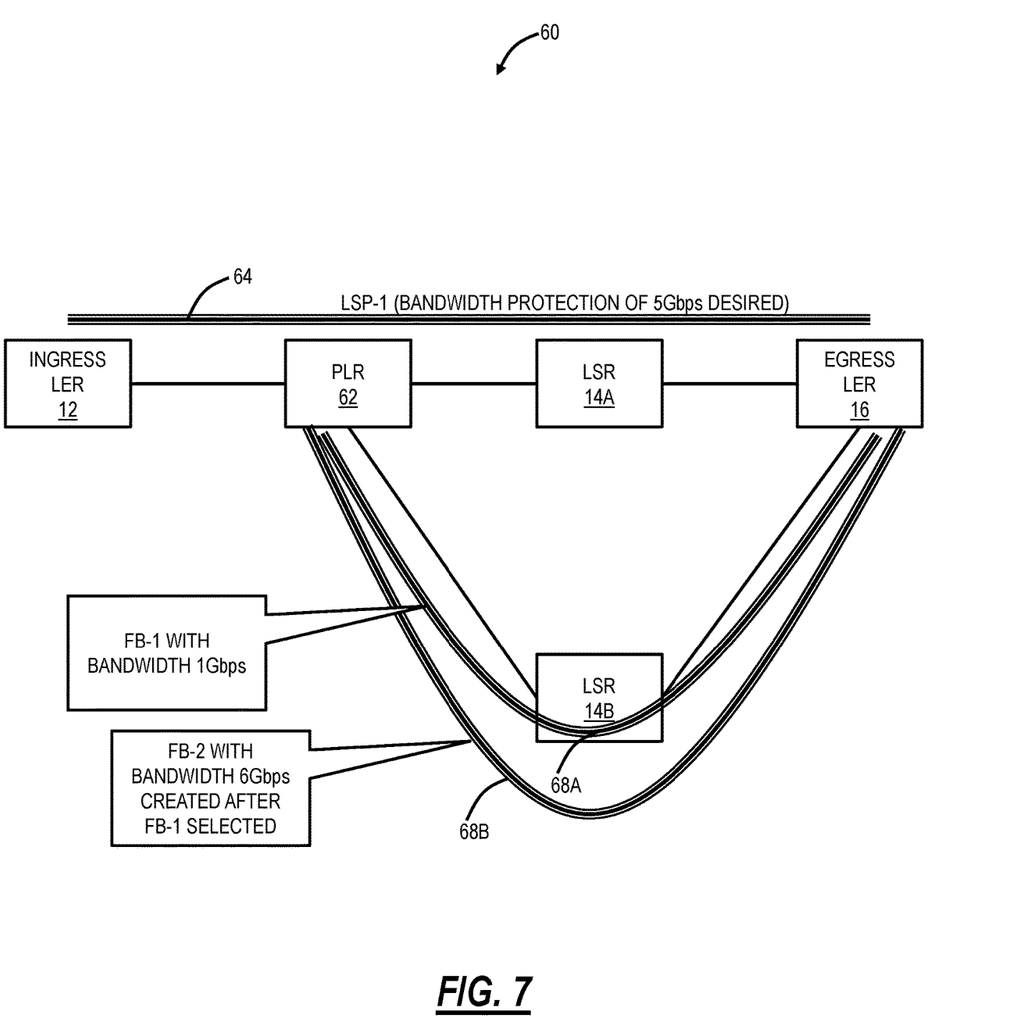
FIG. 7 is a network diagram of the MPLS network with tunnel protected by a bypass tunnel which does not provide full protection of the tunnel and with a subsequent bypass tunnel which provides full protection of the tunnel or better protection from the bypass tunnel.

FIG. 7 is a network diagram of the MPLS network 60 with the tunnel 64 protected by a bypass tunnel 68A which does not provide full protection of the tunnel 64 and with a subsequent bypass tunnel 68B which provides full protection of the tunnel 64 or better protection from the bypass tunnel 68A. Again, the FB approach of FRR local protection over RSVP-TE tunnels offers a backup path to provide bandwidth protection as well as node protection. However, in case bandwidth (or node) protection is not available, RFC 4090 suggest to fallback to a backup path which does not provide the desired protection, i.e., full bandwidth (or node) protection. However, if a bypass tunnel (which can provide desired protection) is available later, currently there is no mechanism to signal reselection.

In FIG. 7, for example, the tunnel 64 desires 5 Gbps bandwidth protection. At the time of signaling/creation, the tunnel 64 initially selects the bypass tunnel 68A which supports 1 Gbps, even though this bandwidth protection is less than desired. At a future point, the bypass tunnel 68B is available with 6 Gbps bandwidth protection. Conventionally, there is no mechanism to have the tunnel 64 reselect the bypass tunnel 68B and the tunnel 64 will continue to use the bypass tunnel 68A as a compromise.

The systems and methods update the SESSION_ATTRIBUTE object in the RSVP-TE PATH Message with a new flag value to indicate "FRR Backup Reselection Request" to trigger reselection. In FIG. 7, with the flag value set to indicate "FRR Backup Reselection Request" for the tunnel 64, the PLR 62 attempts to reselect the bypass tunnel 68B when available since it is better (meaning it provides the desired protection or better protection than the currently selected bypass tunnel 68A).

Figure 8:
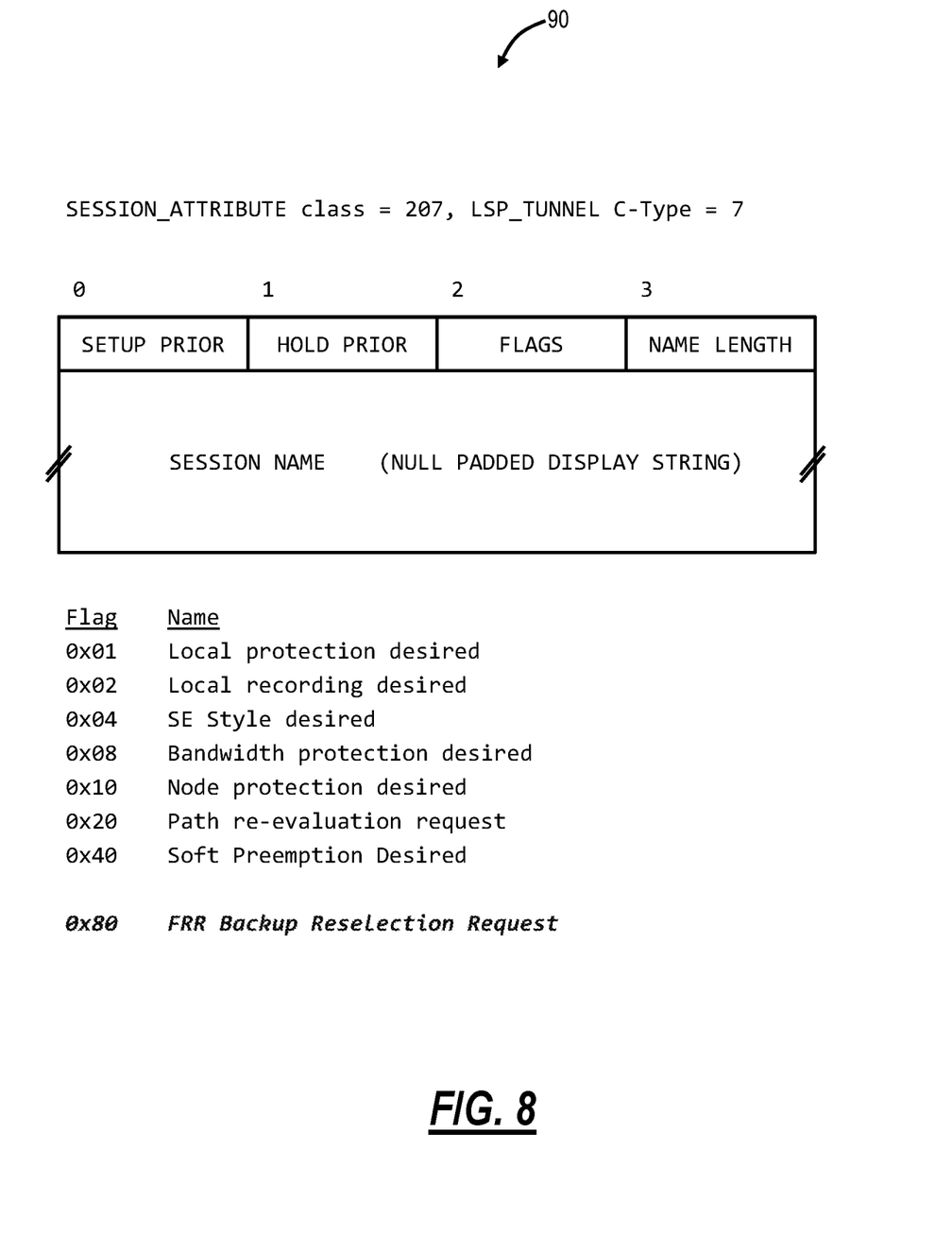
FIG. 8 is a diagram of a SESSION_ATTRIBUTE object which is defined in Sec. 4.7 of RFC 3209 and Sec. 4.3 of RFC 4090.

FIG. 8 is a diagram of a SESSION_ATTRIBUTE object 90 based on definitions in Sec. 4.7 of RFC 3209 and Sec. 4.3 of RFC 4090. SESSION_ATTRIBUTE object 90 defines attributes of the tunnels 64, 68A, 68B. The setup priority and holding priority are as described above with respect to the FAST_REROUTE object 70. The name length is the length of the display string before padding in bytes and the session name is a null padded string of characters. The flags field include the following values, with the last value, 0x80 FRR Backup Reselection Request, proposed herein to enable reselection of the bypass tunnel 68 by the PLR 62.

| Bit Flag | Name |
| --- | --- |
| 0x01 | Local protection desired |
| 0x02 | Local recording desired |
| 0x04 | SE Style desired |
| 0x08 | Bandwidth protection desired |
| 0x10 | Node protection desired |
| 0x20 | Path re-evaluation request |
| 0x40 | Soft Preemption Desired |
| 0x80 | FRR Backup Reselection Request |

The FRR Backup Reselection Request flag indicates to the downstream PLRs 62 that FRR Backup Reselection is requested. On receiving the RSVP PATH message with this flag set, the PLRs attempt to find an bypass tunnel 68 which is "better," in terms of the bandwidth protection, node protection, cost, or some other metric. Once a "better" bypass tunnel 68B is found, old bypass tunnel 68A is disassociated and the new bypass tunnel 68B is associated.

The reselection can be triggered either manually by the operator, by processing some external event such as a route change, timer-driven event, and the like. Once triggered, the ingress LER 12 immediately sends an RSVP PATH message with the "FRR Backup Reselection Request" bit set in flags of the SESSION_ATTRIBUTE object 90. This bit is "not set" in any subsequent RSVP PATH messages. Once such PATH message is received at the PLR 62, it looks for a bypass tunnel 68 as a candidate for a backup path, and, if found, creates a "new" backup over it. Note, an implementation (automatically) or operator (manually) has to avoid triggering reselection if the tunnel is already in a local protection "In Use" state.

Figure 9:
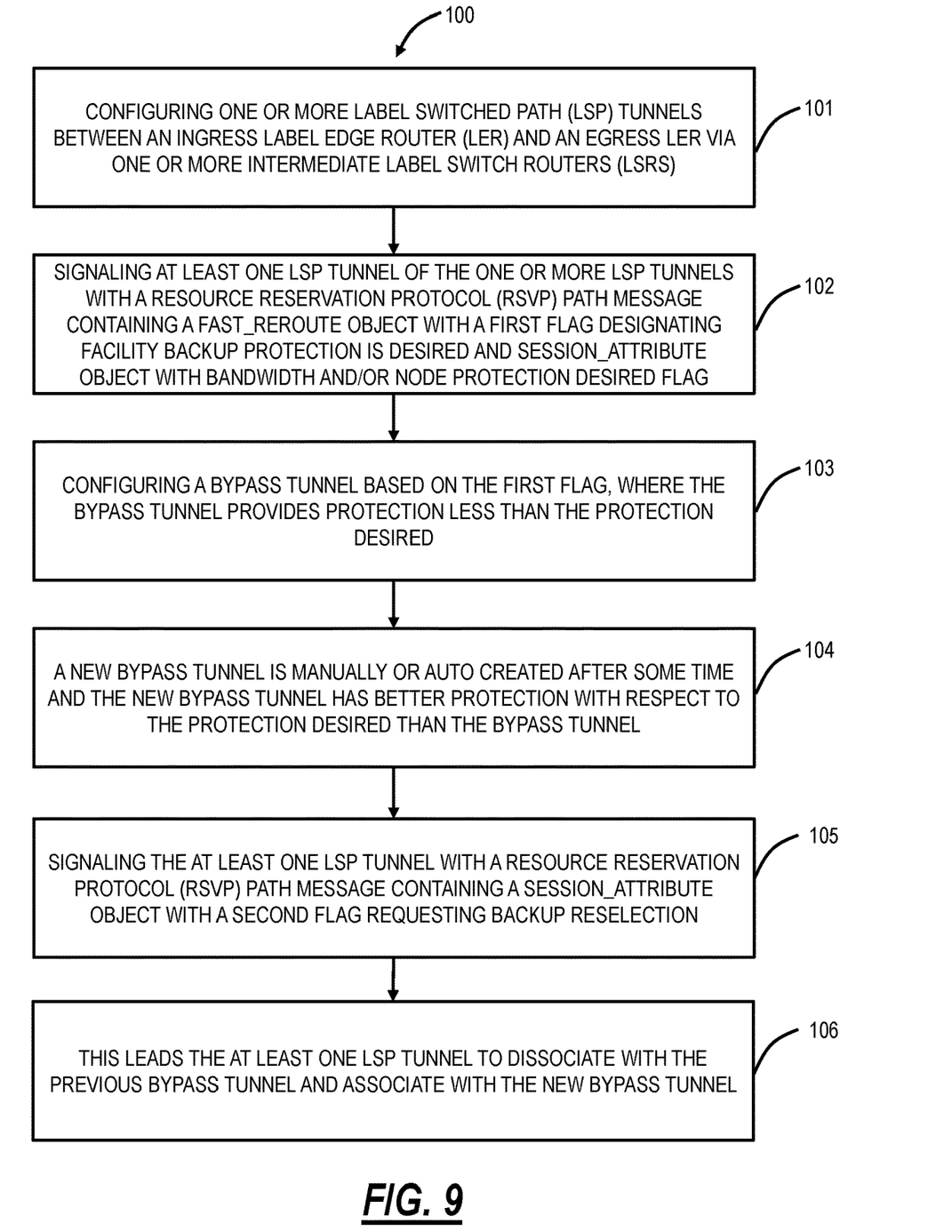
FIG. 9 is a flowchart of a process for reselection of Facility Backup (FB) bypass tunnels in Fast Reroute (FRR) downstream routers.

FIG. 9 is a flowchart of process 100 for reselection of bypass tunnels in Fast Reroute (FRR) downstream routers. The process 100 includes configuring one or more Label Switched Path (LSP) tunnels between an ingress Label Edge Router (LER) and an egress LER via one or more Label Switch Routers (LSRs) (step 101); signaling at least one LSP tunnel of the one or more LSP tunnels with a Resource Reservation Protocol (RSVP) PATH message containing a FAST_REROUTE object with a first flag designating Facility Backup protection is desired and a SESSION_ATTRIBUTE object with protection desired (bandwidth protection and/or node protection) (step 102); configuring a bypass tunnel based on the first flag, where the bypass tunnel provides protection less than the protection desired (step 103); a new bypass tunnel is manually or auto created after some time and the new bypass tunnel has better protection with respect to the protection desired than the bypass tunnel (step 104); signaling the at least one LSP tunnel with a Resource Reservation Protocol (RSVP) PATH message containing a SESSION_ATTRIBUTE object with a second flag requesting backup reselection (step 105); and this leads the at least one LSP tunnel to dissociate with the previous bypass tunnel and associate with the new bypass tunnel (step 106).

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method for auto-creation of bypass tunnels in Fast Reroute (FRR) downstream routers, the method comprising:
   configuring one or more Label Switched Path (LSP) tunnels between an ingress Label Edge Router (LER) and an egress LER via one or more intermediate Label Switch Routers (LSRs);
   signaling at least one LSP tunnel of the one or more LSP tunnels with a Resource Reservation Protocol (RSVP) PATH message containing a FAST_REROUTE object with a first flag indicating Facility Backup protection is desired and a second flag indicating auto-generation of a bypass tunnel;
   configuring the bypass tunnel between a Point of Local Repair (PLR) and a Merge Point (MP) based on the first flag and the second flag, wherein the PLR is one of the intermediate LSRs and the MP is one of the intermediate LSRs or the egress LER, wherein the bypass tunnel is created based on a type of the protection desired, wherein the type comprises one or more of node protection and bandwidth protection, and wherein the bypass tunnel is protection has a characteristic providing less than the protection desired;
   creating a new bypass tunnel which has better protection with respect to the protection desired than the bypass tunnel; and
   wherein the new bypass tunnel is manually or auto created with the better protection with respect to the protection desired than the bypass tunnel leading to the at least one LSP tunnel to dissociate with the bypass tunnel and associate with the new bypass tunnel.

2. The method of claim 1, further comprising:
   responsive to a fault between the PLR and the MP, switching the one or more LSP tunnels to the bypass tunnel.

3. The method of claim 1, wherein the one or more LSP tunnels comprise N tunnels, N>1, and wherein the bypass tunnels comprise M tunnels, M≥1, such that the M bypass tunnels provide M:N protection between the PLR and the MP.

4. The method of claim 1, further comprising:
   signaling the at least one LSP tunnel with a Resource Reservation Protocol (RSVP) PATH message containing a SESSION_ATTRIBUTE object with a third flag requesting backup reselection leading to the at least one LSP tunnel to dissociate with the bypass tunnel and associate with the new bypass tunnel.

5. The method of claim 1, wherein the characteristic is a bandwidth amount.

6. A Multiprotocol Label Switching (MPLS) network, comprising:

an ingress Label Edge Router (LER);
an egress LER; and
one or more Label Switch Routers (LSRs) between the ingress LER and the egress LER,
wherein one or more Label Switched Path (LSP) tunnels are configured between the ingress LER and the egress LER via the one or more LSRs,
wherein at least one LSP tunnel of the one or more LSP tunnels is signaled with a Resource Reservation Protocol (RSVP) PATH message containing a FAST_REROUTE object with a first flag indicating Facility Backup protection is desired and a second flag indicating auto-generation of a bypass tunnel,
wherein the bypass tunnel is configured between a Point of Local Repair (PLR) and a Merge Point (MP) based on the first flag and the second flag, wherein the PLR is one of the intermediate LSRs and the MP is one of the intermediate LSRs or the egress LER;
wherein the bypass tunnel is created based on a type of the protection desired, wherein the type comprises one or more of node protection and bandwidth protection,
wherein the bypass tunnel's protection has a characteristic providing less than the protection desired, and
wherein a new bypass tunnel is manually or auto created with better protection with respect to the protection desired than the bypass tunnel leading to the at least one LSP tunnel to dissociate with the bypass tunnel and associate with the new bypass tunnel.

7. The MPLS network of claim 6, wherein, responsive to a fault between the PLR and the MP, the one or more LSP tunnels are switched to the bypass tunnel.

8. The MPLS network of claim 6, wherein the one or more LSP tunnels comprise N tunnels, N>1, and wherein the bypass tunnels comprise M tunnels, M≥1, such that the M bypass tunnels provide M:N protection between the PLR and the MP.

9. The MPLS network of claim 6, wherein the ingress LER causes signaling of the at least one LSP tunnel with a Resource Reservation Protocol (RSVP) PATH message containing a SESSION_ATTRIBUTE object with a third flag requesting backup reselection.

10. The MPLS network of claim 8, wherein the characteristic is a bandwidth amount.

11. A network element which is a Point of Local Repair (PLR) in a Multiprotocol Label Switching (MPLS) network, the network element comprising:
a plurality of ports;
forwarding circuitry configured to switch packets between the plurality of ports; and
control circuitry communicatively coupled to the plurality of ports and the forwarding circuitry,
wherein one or more Label Switched Path (LSP) tunnels are configured between an ingress Label Edge Router (LER) and an egress LER via the plurality of ports and one or more intermediate Label Switch Routers (LSRs),
wherein at least one LSP tunnel of the one or more LSP tunnels is signaled with a Resource Reservation Protocol (RSVP) PATH message containing a FAST_REROUTE object with a first flag indicating Facility Backup protection is desired and a second flag indicating auto-generation of a bypass tunnel, and
wherein the control circuitry configures the bypass tunnel between a port of the plurality of ports and a Merge Point (MP) based on the first flag and the second flag, wherein the PLR is one of the intermediate LSRs and the MP is one of the intermediate LSRs or the egress LER,
wherein the bypass tunnel is created based on a type of the protection desired, wherein the type comprises one or more of node protection and bandwidth protection,
wherein the bypass tunnel's protection has a characteristic providing less than the protection desired, and
wherein a bypass tunnel is manually or auto created with better protection with respect to the protection desired than the bypass tunnel leading to the at least one LSP tunnel to dissociate with the bypass tunnel and associate with the new bypass tunnel.

12. The network element of claim 1, wherein, responsive to a fault between the PLR and the MP, the one or more LSP tunnels are switched to the bypass tunnel.

13. The network element of claim 11, wherein the one or more LSP tunnels comprise N tunnels, N>1, and wherein the bypass tunnels comprise M tunnels, M≥1, such that the M bypass tunnels provide M:N protection between the PLR and the MP.

14. The network element of claim 11, wherein the control circuitry causes signaling of the at least one LSP tunnel with a Resource Reservation Protocol (RSVP) PATH message containing a SESSION_ATTRIBUTE object with a third flag requesting backup reselection.

* * * * *